United States Patent [19]

Fujii et al.

[11] Patent Number: 5,011,881

[45] Date of Patent: Apr. 30, 1991

[54] AQUEOUS THERMOPLASTIC COATING COMPOSITION FOR PLASTICS MATERIALS AND COATING METHOD USING SAME

[75] Inventors: Yasuhiro Fujii, Kanagawa; Masaru Mitsuji, Zama; Junichi Kajima, Hiratsuka, all of Japan

[73] Assignee: Kansai Paint Company, Limited, Hyogo, Japan

[21] Appl. No.: 465,705

[22] Filed: Jan. 16, 1990

[30] Foreign Application Priority Data

Jan. 18, 1989 [JP] Japan .................................. 1-9433

[51] Int. Cl.$^5$ .............................................. C08L 75/04
[52] U.S. Cl. ..................................... 524/457; 524/507
[58] Field of Search ................................. 524/457, 507

[56] References Cited

U.S. PATENT DOCUMENTS 4,318,833  3/1982  Guagliardo ........................ 524/457

Primary Examiner—Joseph L. Schofer
Assistant Examiner—Jeffrey T. Smith
Attorney, Agent, or Firm—Armstrong, Nikaido, Marmelstein, Kubovcik & Murray

[57] ABSTRACT

Disclosed are (1) an aqueous thermoplastic coating composition for coating plastics substrates, the composition consisting essentially of:
(A) an aqueous acrylic resin and
(B) a urethane resin emulsion, the component (B) being a self-emulsifiable urethane emulsion prepared by subjecting a urethane prepolymer to reaction for chain extension by water and emulsification after or during neutralization of the urethane prepolymer with a tertiary amine, the urethane prepolymer consisting essentially of (i) an aliphatic and/or an alicyclic diisocyanate, (ii) a polyether diol and/or polyester diol both having a number-average molecular weight of about 500 to about 5000, (iii) a low-molecular weight polyhydroxyl compound and (iv) a dimethylolalkanoic acid in NCO/OH equivalent ratio of 1.1–1.9 : 1, the amount of the component (A) being about 1 to about 12% by weight and the amount of the component (B) being about 99 to about 88% by weight, based on the combined weight (calculated as solids) of the two components; and (2) a two-coat coating method for coating a plastics substrate, the method comprising the steps of coating a plastics substrate with a base-coat composition containing a coloring pigment and/or metallic pigment, applying a clear coat composition to the cured or uncured coating for forming a transparent coating and curing the clear coating or the two coatings at the same time at a temperature lower than about 120° C., the method being characterized by the use of the aqueous thermoplastic coating composition as defined above in (1) as the base-coat composition.

5 Claims, No Drawings

AQUEOUS THERMOPLASTIC COATING COMPOSITION FOR PLASTICS MATERIALS AND COATING METHOD USING SAME

The present invention relates to a novel aqueous thermoplastic coating composition for plastics materials and a method of coating plastics materials using the composition.

In recent years, plastics have been increasingly used in place of metals for producing the body panels and the components of motor vehicles, two-wheel vehicles, electrical appliances, etc. particularly because plastics are lightweight and easily moldable into an article.

Plastics articles have been finished with an organic solvent-diluted thermosetting top-coat composition capable of giving a coating excellent in surface smoothness, distinctness-of-image gloss, weatherability and the like. Plastics articles are generally coated by a two-coat one-bake method comprising coating the article with an organic solvent-diluted thermosetting base-coat composition containing a coloring pigment and/or metallic pigment, air-drying the coating, applying a clear organic solvent-diluted top-coat composition to the dried coating and curing the two coatings at the same time.

However, from the viewpoints of air-pollution problems and savings in resources, it has been strongly desired in recent years to reduce the quantities of organic solvents to be used, and investigations are under way on base-coat compositions used in the two-coat method for a change-over from base-coat compositions containing a large quantity of organic solvent to aqueous compositions.

We have already proposed a coating method using an aqueous thermosetting base-coat composition predominantly containing a water-dispersible acrylic resin, an amino resin and a metallic pigment or coloring pigment (Japanese Unexamined Patent Publication No. 193676/1987). However, when this method is applied to coat plastics articles, the following problems are caused. Plastics may deform or change the properties at high temperature for curing. Yet if the composition is cured at low temperatures (up to about 120° C.) to avoid such problem, the composition is not fully cured and gives a coating poor in physical properties at low temperatures (below the freezing point).

An object of the present invention is to provide a novel aqueous thermoplastic coating composition suitable as a base-coat composition for coating plastics materials by the two-coat coating method, and a coating method using the composition.

Another object of the present invention is to provide a novel aqueous thermoplastic coating composition for coating plastics substrates and capable of giving a coating which has surface smoothness, distinctness-of-image gloss and weatherability comparable to or higher than when formed by the two-coat one-bake method using a conventional organic solvent-diluted thermosetting base-coat composition and which is improved in the curability at low temperatures up to about 120° C. and in the physical properties of resulting coating at low temperatures below the freezing point and the like, and a coating method using the composition.

These and other objects of the present invention will become apparent from the following description.

The present invention provides an aqueous thermoplastic coating composition for coating plastics substrates, the composition consisting essentially of:

(A) an aqueous acrylic resin and
(B) a urethane resin emulsion, the component (B) being a self-emulsifiable urethane emulsion prepared by subjecting a urethane prepolymer to reaction for chain extension by water and emulsification after or during neutralization of the urethane prepolymer with a tertiary amine, the urethane prepolymer consisting essentially of (i) an aliphatic and/or an alicyclic diisocyanate, (ii) a polyether diol and/or polyester diol both having a number-average molecular weight of about 500 to about 5000, (iii) a low-molecular weight polyhydroxyl compound and (iv) a dimethylolalkanoic acid in NCO/OH equivalent ratio of 1.1–1.9:1, the amount of the component (A) being about 1 to about 12% by weight and the amount of the component (B) being about 99 to about 88% by weight, based on the combined weight (calculated as solids) of the two components.

The present invention also provides a two-coat coating method for coating a plastics substrate, the method comprising the steps of coating a plastics substrate with a base-coat composition containing a coloring pigment and/or metallic pigment, applying a clear coat composition to the cured or uncured coating for forming a transparent coating and curing the clear coating or the two coatings at the same time at a temperature less than about 120° C., the method being characterized by the use of the foregoing aqueous thermoplastic coating composition as the base-coat composition.

We conducted extensive research on aqueous coating compositions which are capable of giving coatings comparable or superior to those produced by the two-coat one-bake coating method using a conventional organic solvent-diluted thermosetting coating composition, and which are improved in both the curability at low temperatures up to about 120° C. and physical properties of the resulting coating at low temperatures below the freezing point and suitable for coating plastics substrates, and on coating methods using the composition.

Our research revealed that an aqueous coating composition prepared by admixing an aqueous acrylic resin with the above-specified urethane resin emulsion is useful as the base-coat composition in the two-coat coating method and that the aqueous coating composition can satisfactorily fulfill the above objects of the invention.

The present invention has been accomplished based on these novel findings.

First, the aqueous coating composition of the present invention will be described below in detail.

Component (A): Aqueous acrylic resin

This resin is prepared from an acrylic resin as a base resin component and water or a solvent mixture or dispersing medium mixture both predominantly containing water. The acrylic resin is in the form of an aqueous solution or an aqueous emulsion.

In the present invention, it is desired that the solution or emulsion of the acrylic resin has an excellent ability to disperse coloring pigments and metallic pigments. Particularly suitable for use are aqueous solutions of acrylic resin in which such pigments are highly dispersible.

Useful aqueous solutions of acrylic resin are prepared by dissolving a water-soluble acrylic resin in water. Examples of the water-soluble acrylic resin are those having introduced therein carboxyl group (—COOH), hydroxyl group (—OH), methylol group (—CH$_2$OH), amino group (—NH₂), sulfone group (—SO₃H), polyoxyethylene bond [—(CH₂CH₂)—$_n$] and the like. Among these resins, most typical are those having carboxyl group introduced therein, neutralized to an alkali salt and thereby made soluble in water.

The carboxyl group-containing acrylic resin can be prepared by copolymerizing α,β-ethylenically unsaturated carboxylic acid with an acrylic monomer.

Usable as the α,β-ethylenically unsaturated carboxylic acid are, for example, acrylic or methacrylic acid and like monocarboxylic acids; maleic acid, fumaric acid, itaconic acid and like dicarboxylic acids; half-esters of these dicarboxylic acids; etc. The acrylic monomer for use in preparing the acrylic resin is at least one monomer selected from: esters of acrylic or methacrylic acid and monohydric alcohol having 1 to 20 carbon atoms, examples of said esters being methyl acrylate or methacrylate, ethyl acrylate or methacrylate, propyl acrylate or methacrylate, butyl acrylate or methacrylate, 2-ethylhexyl acrylate or methacrylate and the like; compounds having two or more polymerizable double bonds per molecule and prepared by reacting an acrylic or methacrylic acid with a dihydric or polyhydric alcohol having 2 to 16 carbon atoms, examples of such compounds being ethylene glycol diacrylate or dimethacrylate, 1,6-hexane diacrylate or dimethacrylate, trimethylolpropane diacrylate or dimethacrylate, allyl acrylate or methacrylate, trimethylolpropane triacrylate or trimethacrylate and the like; hydroxy-containing alkyl (C$_{2-10}$) acrylate or methacrylate such as hydroxyethyl acrylate or methacrylate, hydroxypropyl acrylate or methacrylate and the like; etc. Also usable as the acrylic monomer are N-propoxymethyl acrylamide or methacrylamide, N-butoxymethyl acrylamide or methacrylamide, glycidyl acrylate or methacrylate, styrene, vinyl acetate, etc.

Suitable water-soluble acrylic resins are those having an acid value in the range of from about 20 to about 150, preferably from about 30 to about 100.

Examples of useful neutralizing agents for neutralization of carboxyl-containing water-soluble acrylic resin are ammonia and water-soluble amino compounds such as monoethanolamine, ethylamine, 2-amino-2-methylpropanol, dimethylamine, diethylamine, triethylamine, propylamine, dipropylamine, isopropylamine, diisopropylamine, diethanolamine, triethanolamine, butylamine, dibutylamine, 2-ethylhexylamine, ethylenediamine, propylenediamine, methylethanolamine, dimethylethanolamine, diethylethanolamine, morpholine, etc. Among them, triethylamine, dimethylethanolamine and like tertiary amines are preferable.

The aqueous solution of acrylic resin can be prepared by neutralizing the carboxyl group of the water-soluble acrylic resin with the above-exemplified neutralizing agent substantially corresponding in equivalence to the carboxyl group and dissolving the resulting mixture in water.

The acrylic resin emulsion has acrylic resin particles uniformly dispersed in an aqueous medium and can be obtained by subjecting an acrylic monomer to emulsion polymerization in an aqueous solution of a dispersion stabilizer.

Examples of dispersion stabilizers useful in the polymerization are polyoxyethylene nonyl phenyl ether and like nonionic surfactants, polyoxyethylene alkyl allyl ether sulfuric acid ester salt and like anionic surfactants, and acrylic resins and like water-soluble resins about 20 to about 150 in acid value and about 5000 to about 30000 in number-average molecular weight.

The aqueous medium is a solution of the dispersion stabilizer in water.

Examples of the acrylic monomer to be subjected to emulsion polymerization in the aqueous medium include those exemplified hereinbefore. These acrylic monomers can be used conjointly with the foregoing α,β-ethylenically unsaturated carboxylic acids and other monomers.

Especially preferable as the acrylic resin emulsion is the one prepared by subjecting the α,β-ethylenically unsaturated carboxylic acid and the above-exemplified acrylic monomer to emulsion polymerization. Further the emulsion prepared by a multi-stage polymerization process has an improved amenability to coating operation and the like, hence desirable.

A preferred acrylic resin emulsion is one in which the dispersed resin particle is internally crosslinked in view of mechanical stability, storage stability and like properties.

It is desired that the resin particles which contain the acrylic monomer as the main component and which are dispersed in the emulsion have a mean particle size of about 0.05 to about 1.0 μm.

It is preferred in the present invention to disperse the coloring pigment and/or metallic pigment in the component (A), preferably in an aqueous solution of acrylic resin, and then admix the resulting dispersion with a urethane resin emulsion as the component (B).

Component (B): Urethane resin emulsion

The component (B) is an aqueous dispersion of self-emulsifiable urethane resin about 0.001 to about 1.0 μm in mean particle size prepared by the following method. First a urethane prepolymer is synthesized by subjecting to a one-shot or multi-stage polymerization optionally in a hydrophilic organic solvent free of active hydrogen in the molecule: (i) an aliphatic and/or alicyclic diisocyanate, (ii) a polyether diol or polyester diol both having a number-average molecular weight of about 500 to about 5000 or a mixture thereof, (iii) a low-molecular weight polyhydroxyl compound and (iv) a dimethylolalkanoic acid in an NCO/OH equivalent ratio of 1.1–1.9:1. The obtained prepolymer is mixed with water after or during neutralization of prepolymer with a tertiary amine, and the resulting mixture is subjected to reaction for chain extension by water while being emulsified and dispersed in water. Thereafter, when required, the organic solvent is distilled off.

Examples of the component (i) for use in the preparation of the urethane prepolymer, i.e., aliphatic or alicyclic diisocyanate, include aliphatic diisocyanates having 2 to 12 carbon atoms such as hexamethylene diisocyanate, 2,2,4-trimethylhexane diisocyanate and lysine diisocyanate; alicyclic diisocyanates having 4 to 18 carbon atoms such as 1,4-cyclohexane diisocyanate, 1-isocyanato-3-isocyanatomethyl-3,5,5-trimethylcyclohexane (isophorone diisocyanate), 4,4'-dicyclohexylmethane diisocyanate, methylcyclohexylene diisocyanate and isopropylidene dicyclohexyl-4,4'-diisocyanate; modified products of these diisocyanates (such as those containing carbodiimide, uretdione, uretone imine or the like); and mixtures of at least two of them; etc. Among them, preferred are alicyclic diisocyanates, especially 1,4-cyclohexane diisocyanate, 1-isocyanato-3-isocyanatomethyl-3,5,5-trimethylcyclohexane and 4,4'-dicyclohexylmethane diisocyanate.

Use of aromatic diisocyanate as the component (i) tends to cause the discoloration of coating exposed to ultraviolet light, hence undesirable.

Examples of the component (ii) for use in the preparation of the urethane prepolymer, i.e., polyether diols and polyester diols both having a number-average molecular weight of about 500 to about 5000, preferably about 1000 to about 3000, include those prepared by polymerizing or copolymerizing (block or random copolymerization) alkylene oxide (such as ethylene oxide, propylene oxide, butylene oxide or the like) and/or a heterocyclic ether (such as tetrahydrofuran or the like), examples of the resulting polymers being polyethylene glycol, polypropylene glycol, polyethylene-propylene (block or random) glycol, polytetramethylene ether glycol, polyhexamethylene ether glycol and polyoctamethylene ether glycol; condensation polymers of dicarboxylic acid (such as adipic acid, succinic acid, sebatic acid, glutaric acid, maleic acid, fumaric acid, phthalic acid or the like) with glycol (such as ethyelene glycol, propylene glycol, 1,4-butanediol, 1,6-hexanediol, 3-methyl-1,5-pentanediol, neopentyl glycol, bishydroxymethylcyclohexane or the like), examples of the condensation polymers being polyethylene adipate, polybutylene adipate, polyhexamethylene adipate, polyneopentyl adipate, poly-3-methylpentyl adipate, polyethylene/butylene adipate and polyneopentyl/hexyl adipate; polylactone diols such as polycaprolactone diol and poly-3-methylvalerolactone diol; polycarbonate diols; mixtures of at least two of them; etc.

Examples of the component (iii) for use in the preparation of the urethane prepolymer, i.e., low-molecular weight polyhydroxyl compounds, include those of 500 or less in number-average molecular weight, e.g. glycols as exemplified above as the material for the polyester diol and low-molecular weight addition products (molecular weight of 500 or less) of the glycol with alkylene oxide; trihydric alcohols such as glycerin, trimethylol ethane, trimethylol propane and the like and low-molecular weight addition products (molecular weight of 500 or less) of the alcohol with alkylene oxide; mixtures of at least two of them; etc. The low-molecular weight polyhydroxyl compound is used in an amount of about 0.1 to about 20% by weight, preferably about 0.5 to about 10% by weight, based on the polyether diol or polyester diol.

Examples of the component (iv) for use in the preparation of the urethane prepolymer, i.e., dimethylolalkanoic acid, include dimethylolacetic acid, dimethylolpropionic acid, dimethylolbutyric acid, etc. among which dimethylolpropionic acid is preferred. The dimethylolalkanoic acid is used in an amount of about 0.5 to about 5% by weight, preferably about 1 to about 3% by weight (calculated as the carboxyl group (—COOH)), based on the urethane prepolymer prepared by reacting the components (i) to (iv). If the amount of carboxyl group is less than about 0.5% by weight, it is difficult to prepare a stable emulsion. However, if the amount exceeds 5% by weight, the hydrophilic property is increased, rendering the emulsion highly viscous and decreasing the water resistance of coating.

Examples of tertiary amines useful for neutralization of dimethylolalkanoic acid are trialkylamines such as trimethylamine, triethylamine, triisopropylamine, tri-n-propylamine, and tri-n-butylamine; N-alkylmorpholines such as N-methylmorpholine and N-ethylmorpholine; N-dialkylalkanolamines such as N-dimethylethanolamine and N-diethylethanolamine; mixtures of at least two of them; etc. Among them, preferable is trialkylamine and more preferable is triethylamine. The neutralization degree of tertiary amine is about 0.5 to about 1 equivalent, preferably about 0.7 to about 1 equivalent, per equivalent of carboxyl group of dimethylolalkanoic acid.

The ratio (ratio by weight, calculated as solids) of the component (A)/the component (B) for preparing the aqueous coating composition of the invention is about 12/88 to about 1/99, preferably about 11/89 to about 5/95. If the amount of the component (A) used exceeds 12% by weight, the coating formed is given reduced water resistance. On the other hand, the use of the component (A) in an amount less than 1% by weight impairs the dispersion stability of the pigment(s), resulting in the reduction in the range of colors to be used for the coating. Therefore the use of the component (A) in an amount outside said range is undesirable.

The aqueous coating composition of the invention may contain a metallic pigment and/or coloring pigment which are commonly employed for coating compositions. Preferably the addition of the pigment is done by dispersing the pigment in the aqueous acrylic resin as the component (A). Examples of preferred metallic pigments are aluminum flake, micaceous iron oxide, mica flake, metallic oxide-coated micaceous iron oxide, metallic oxide-coated mica flake, etc. Examples of useful coloring pigments are titanium dioxide, iron oxide, chromium oxide, lead chromate, carbon black and like inorganic pigments, Phthalocyanine Blue, Phthalocyanine Green, Carbazole Violet, Anthrapyrimidine Yellow, Flavanthrone Yellow, Isoindoline Yellow, Indanthrone Blue, Quinacridone Violet and like organic pigments. The amount of the pigment(s) to be used is not specifically limited but is suitably about 2 to about 40 parts by weight per 100 parts by weight of the combined amount of the components (A) and (B).

The aqueous coating compositions of the invention consists essentially of the component (A) and the component (B) and may contain said pigment(s) when so required. Little or no crosslinking reaction occurs in the components (A) and (B) during the storage thereof or in the step of the formation of coatings. When heated at a temperature less than 120° C., preferably about 40° to about 110° C., more preferably about 70° to about 100° C., the water and like volatile ingredients are evaporated off and the components (A) and (B) are molten to form a thermoplastic coating. The coating thus formed presents a pleasing appearance and exhibits outstanding solvent resistance, impact resistance, physical properties at a temperature lower than the freezing point and the like.

Described below is a method of coating plastics substrates by the two-coat method using the aqueous coating composition of the invention.

The substrates to be coated with the coating composition of the invention can be any of those made of plastics and the kind of plastics is not specifically limited. Useful plastics are, for example, polyurethane, polycarbonate, polybutyleneterephthalate, polyamide, polyphenyleneoxide, copolymer of acrylonitrile/butadiene/styrene (ABS resin), polypropyrene, unsaturated polyester (SMC), etc. Examples of especially suitable plastics articles to be coated with the aqueous composition of the invention are the body panels and the components of motor vehicles such as automobiles, buses, trucks, etc., which are made of the above-exemplified plastics to which alone, however, useful substrates are not limited.

Before application of the aqueous coating composition of the invention, the plastics substrates, if required, may be degreased or may be coated with a primer or an intermediate coat.

The aqueous coating composition of the present invention is preferably adjusted, prior to application, to a solids content of about 10 to about 40% by weight and to a viscosity of about 800 to about 5000 cps/6 r.p.m. (B-type viscometer) by adding deionized water and, when required, additives such as a thickener and a deforming agent.

Preferably the aqueous coating composition is applied to a plastics substrate as by spray coating or the like to form a coating of about 10 to about 50 μm in dry thickness and then dried in air or hot air (at about 40° to about 120° C.) until the water content of the coating is reduced to about 25% by weight or lower. A transparent top-coat composition is then applied as by electrostatic spray coating or the like to the resulting coating to a dry thickness of about 15 to about 70 μm. Subsequently, the coated plastics substrate is set in a usual manner and then heated at a temperature lower than about 120° C., preferably about 40° to about 120° C., to cure the clear coating or the two coatings at the same time.

In the present invention, the transparent top-coat composition to be applied on the coating formed from the aqueous coating composition is a liquid coating composition containing the coating material(s) dissolved or dispersed in an organic solvent. Usable as such top-coat composition are those curable by drying at a temperature lower than about 120° C., preferably about 40° to about 110° C., more preferably about 70° to about 100° C. A preferred top-coat composition is a liquid coating composition curable by crosslinking reaction and comprising as main components a polyisocyanate compound and a polyester resin, an acrylic resin, a fluorine-containing resin or like resin which has introduced therein hydroxyl group or like active hydrogen-containing functional group. The top-coat composition is suitably selectable from these compositions, which are already known, depending on the purpose of use. Also usable is a coating composition comprising as a main component a resin which contains epoxy group and hydrolyzable group directly attached to silicon atom and/or hydroxysilane group.

These top-coat compositions may contain a coloring pigment or the like in such amount that the addition will not impair the transparency of the coating formed.

The present invention will be described below in more detail with reference to the following preparation examples and examples in which the parts and percentages are all by weight unless otherwise specified.

PREPARATION EXAMPLE 1

Aqueous solution of acrylic resin (A-1)

Into a reactor were placed 60 parts of butyl cellosolve and 15 parts of isobutyl alcohol, which were then heated to 115° C. in a nitrogen stream. Then a mixture of 26 parts of n-butyl acrylate, 48 parts of methyl methacrylate, 10 parts of styrene, 10 parts of 2-hydroxyethyl methacrylate, 6 parts of acrylic acid and 1 part of azoisobutyronitrile was added to the contents of the reactor over a period of 3 hours. After the completion of addition, the mixture was aged at 115° C. for 30 minutes, and a mixture of 1 part of azobisisobutyronitrile and 115 parts of butyl cellosolve was added to the mixture over a period of 1 hour. The resulting mixture was aged at 115° C. for 30 minutes and filtered with 200-mesh nylon cloth at 50° C.

The obtained reaction product was 48 in acid value, $Z_4$ in viscosity (Gardener bubble viscometer) and 55% in nonvolatile content. The product was neutralized with dimethylaminoethanol corresponding in the equivalence to the carboxyl group. Deionized water was added to obtain a 50% aqueous solution of acrylic resin (A-1).

PREPARATION EXAMPLE 2

Aqueous solution of acrylic resin (A-2)

| Styrene | 30 parts |
| Isobutyl methacrylate | 48 parts |
| 2-Hydroxyethyl methacrylate | 12 parts |
| Acrylic acid | 10 parts |
| Azobisisobutyronitrile | 1 part |

The above ingredients were added dropwise to 100 parts of cellosolve heated at 120° C. for polymerization for hours. A 60-part quantity of the solvent was distilled off and the residue was neutralized with triethyl amine corresponding in the equivalence to the carboxyl group. Water was added to give an aqueous solution of acrylic resin (A-2) having a solids content of 50%.

PREPARATION EXAMPLE 3

Aqueous solution of acrylic resin (A-3)

| Styrene | 35 parts |
| Ethyl methacrylate | 45 parts |
| 2-Hydroxyethyl acrylate | 10 parts |
| Acrylamide | 5 parts |
| Acrylic acid | 5 parts |
| Azobisisobutyronitrile | 1 part |

The above ingredients were added dropwise to 100 parts of cellosolve refluxed with heating to effect polymerization for 6 hours. The solvent was removed and the residue was neutralized with dimethylaminoethanol corresponding in the equivalence to the carboxyl group. Water was added to give a 50% aqueous solution of acrylic resin (A-3).

PREPARATION EXAMPLE 4

Preparation of urethane resin emulsion (B-1)

A polymerizer was charged with 115.5 parts of polybutylene adipate of 2000 in number-average molecular weight, 115.5 parts of polycaprolactone diol of 2000 in number-average molecular weight, 23.2 parts of dimethylolpropionic acid, 6.5 parts of 1,4-butanediol and 120.1 parts of 1-isocyanato-3-isocyanatomethyl-3,5,5-trimethylcyclohexane (IPDI). The mixture was reacted in nitrogen atmosphere with stirring at 85° C. for 7 hours, giving an NCO-terminated prepolymer containing 4.0% NCO. The prepolymer was cooled to 50° C. and was homogeneously dissolved in 165 parts of acetone. Then 15.7 parts of triethylamine was added with stirring. A 600-part quantity of ion exchange water was added to the mixture maintained at 50° C. or lower. The obtained aqueous dispersion was held at 50° C. for 2 hours to complete the reaction for chain extension by water. The acetone was distilled off at 70° C. or lower under reduced pressure, giving 944 parts of a urethane resin emulsion (B-1) containing 42.0% solids.

PREPARATION EXAMPLE 5

Preparation of urethane resin emulsion (B-2)

A pressure polymerizer was charged with 115.5 parts of polypropylene glycol of 2100 in number-average molecular weight, 115.5 parts of polytetramethylene ether glycol of 2000 in number-average molecular weight, 23.2 parts of dimethylolpropionic acid, 6.7 parts of trimethylolpropane, 141.7 parts of 4,4'-dicyclohexylmethane diisocyanate and 174 parts of acetone. After replacing the atmosphere in the reactor with nitrogen, the mixture was reacted with stirring at 85° C. for 5 hours, giving a solution of an NCO-terminated prepolymer in acetone with 2.6% NCO content. The same procedure as in Preparation Example 4 was followed, giving 1045 parts of a urethane resin emulsion (B-2) containing 40.1% solids.

PREPARATION EXAMPLE 6

Preparation of urethane resin emulsion (B-3)

A polymerizer was charged with 115.5 parts of polycaprolactone diol of 2050 in number-average molecular weight, 115.5 parts of polyneopentyl/hexyl adipate of 2450 in number-average molecular weight, 9.9 parts of 1,6-hexanediol and 141.7 parts of 4,4'-dicyclohexylmethane diisocyanate. The mixture was reacted in nitrogen atmosphere at 110° C. for 3 hours. Dimethylolpropionic acid (23.2 parts) was added thereto and the mixture was reacted at the same temperature for 3 hours, giving a prepolymer with 3.7% NCO content. The prepolymer was uniformly dissolved in 176 parts of acetone. The solution of prepolymer in acetone was added with high speed stirring to a solution of 16.7 parts of triethylamine in 640 parts of water charged in another reactor. The mixture was treated in the same manner as in Preparation Example 4, giving 1018 parts of a urethane resin emulsion (B-3) containing 41.5% solids.

PREPARATION EXAMPLE 7

Preparation of transparent top-coat composition (T-1)

An acrylic resin solution containing 60% of resin solids was prepared by polymerizing 25 parts of methyl acrylate, 25 parts of ethyl acrylate, 36.5 parts of n-butyl acrylate, 12 parts of 2-hydroxyethyl acrylate and 1.5 parts of acrylic acid in xylene in the presence of 2.5 parts of a polymerization initiator ($\alpha,\alpha'$-azobisisobutyronitrile). The resin was 58 in hydroxyl value and 12 in acid value.

The obtained resin was mixed with "Duranate 24A" (water adduct of hexamethylene diisocyanate, product of Asahi Chemical Industry Co., Ltd.) in the OH/NCO mole ratio of 1/1, and the mixture was adjusted to a viscosity of 25 seconds (Ford cup No.4/20° C.) with "Swasol #1500" (organic solvent, product of Cosmo Oil Co., Ltd.), giving a clear coat composition (T-1).

EXAMPLE 1

Twenty parts of an aluminum paste (scaly aluminum metallic pigment content: 65%) was mixed with 20 parts of butyl cellosolve and 20 parts of the aqueous solution of acrylic resin (A-1) for dispersion of the aluminum pigment.

Sixty parts of the obtained dispersion was admixed with 214 parts of the urethane resin emulsion (B-1) and 217 parts of deionized water. Then 3 parts of "Acrysol ASE-60" (thickener, product of Rohm & Haas Co.) was added thereto, giving an aqueous metallic base-coat composition (M-1) according to the invention which had the following characteristics.

Apparent viscosity: 2800 cps/6 rpm (B-type viscometer)
pH: 7.60

EXAMPLE 2

Twenty parts of an aluminum paste (scaly aluminum metallic pigment content: 65%) was mixed with 20 parts of butyl cellosolve and 16 parts of the aqueous solution of acrylic resin (A-2) for dispersion of the aluminum pigment.

Fifty-six parts of the obtained dispersion was admixed with 230 parts of the urethane resin emulsion (B-2) and 200 parts of deionized water. "Acrysol ASE-60" was added thereto for adjustment of viscosity, giving an aqueous metallic base-coat composition (M-2) according to the invention which had the following characteristics.

Apparent viscosity : 2900 cps/6 rpm (B-type viscometer)
pH: 7.65

EXAMPLE 3

Twenty parts of an aluminum paste (scaly aluminum metallic pigment content: 65%) was mixed with 20 parts of butyl cellosolve and 12 parts of the aqueous solution of acrylic resin (A-3) for dispersion of the aluminum pigment.

Fifty-two parts of the obtained dispersion was admixed with 227 parts of the urethane resin emulsion (B-3) and 212 parts of deionized water. Then "Acrysol ASE-60" was added thereto for adjustment of viscosity, giving an aqueous metallic base-coat composition (M-3) according to the invention which had the following characteristics.

Apparent viscosity : 2800 cps/6 rpm (B-type viscometer)
pH: 7.61

EXAMPLE 4

Coating operation was conducted by the two-coat coating method using the aqueous base-coat compositions and the clear coat composition prepared in preceding examples.

Plastics test pieces to be coated were prepared as follows. A substrate of polyurethane was subjected to vapor degreasing with trichloroethane for 1 minute. A urethane elastomer primer ("SOFLEX No. 1000," product of Kansai Paint Co., Ltd.) was applied by spraying to the substrate to a dry thickness of 15 μm and dried at 80° C. for 30 minutes.

Each of the base-coat compositions prepared in Examples 1 to 3 was applied to the test piece twice with a spray gun at a temperature of 25° C. and a relative humidity of 65%. The first coating was allowed to set for 2 minutes before the second application of the composition. The spray gun was used at an air pressure of 5 kg/cm$^2$ and at a composition flow rate of 350 ml/min and was positioned at a distance of 35 cm from the test piece to be coated. The test piece to be coated was held upright during the entire coating operation. The test piece coated twice was allowed to stand for 2 minutes, dried in air at a temperature of 80° C. for 10 minutes and cooled to room temperature until a volatile content of about 20% in the coating was reached. Using an electrostatic gun, the coated test piece was further coated with the clear coat composition (T-1) prepared in Preparation Example 7. The coating was allowed to set for 5 minutes, dried and cured at 80° to 90° C. for 30 minutes. In this way, the test piece was coated by the two-coat coating method.

The coatings were checked for appearance and tested for other properties. Table 1 shows the results.

The test methods are as follows.

(1) Finishing properties

To check sagging, the test piece having a hole, 10 mm in diameter, was used and the length of sagging of the applied composition formed downward from the hole was measured. The mark A represents 0- to 2-mm-long sagging, the mark B 2- to 4-mm-long sagging, and the mark C 4- to 6-mm-long sagging.

The coating was checked for mottling with the unaided eye. The mark A represents almost no mottling, the mark B some mottling, and the mark C marked mottling.

(2) Physical properties at low temperatures (below the freezing point)

The physical properties at low temperatures were evaluated in terms of flexibility. The coated plastics test piece was allowed to stand for 2 hours or longer in a chamber maintained at a low temperature of −30° C. After it was confirmed that the substrate was cooled to −30° C., a round rod of ½ inch diameter was put against the coated test piece, which was then bent at an angle of 180° in one second. The flexibility was evaluated according to the following ratings:

A: No crack was found on the coating
B: Crack was found on the coating
C: Marked degree of crack was found on the coating

(3) Water resistance

The coated test piece was immersed in warm water at a temperature of 40° C. for 240 hours.

On withdrawal of the coated test piece from the tester, the waterdrops were wiped away from the coated test piece. The coating on the test piece was observed to detect the undesired change such as blistering, shrinkage and the like. The result was rated according to the following criteria in comparison with the coated test piece before testing. The mark A represents no change, the mark B a slight degree of blistering, shrinkage and/or the like, and the mark C a marked degree of blistering.

(4) Impact resistance

A 500-gram weight was dropped onto the coated surface of the test piece using a Du Pont impact tester (impact rod of ½ in. in radius) to determine a maximum distance of fall (cm) at which the coating remained free of cracking.

TABLE 1

| Example | 1 | 2 | 3 |
|---|---|---|---|
| Metallic base-coat composition | (M-1) | (M-2) | (M-3) |
| Clear coat composition | (T-1) | (T-1) | (T-1) |
| Finishing properties | | | |
| Sagging | A | A | A |
| Mottling | A | A | A |
| Physical properties at low temperatures | A | A | A |
| Water resistance | A | A | A |
| Impact resistance | 50 | 50 | 50 |

Table 1 reveals that the coatings formed from the aqueous coating compositions of the present invention exhibited good finishing properties and were outstanding in curability at low temperatures up to about 120° C., physical properties at low temperatures below the freezing point, high impact resistance and the like as well as water resistance.

Because of the urethane resin emulsion contained therein, the aqueous coating compositions of the invention have remarkable physical properties of the resulting coating at low temperatures and exhibit improved surface smoothness, distinctness-of-image gloss, weatherability and other properties when used as the basecoat composition in the two-coat coating method. Moreover, with high curability at low temperatures, the aqueous coating compositions of the invention are significantly suitable for coating plastics substrates having a low thermal deformation temperature.

We claim:

1. An aqueous thermoplastic coating composition for coating plastics substrates, the composition consisting essentially of:
   (A) an aqueous acrylic resin and
   (B) a urethane resin emulsion,
   the component (B) being a self-emulsifiable urethane emulsion prepared by subjecting a urethane prepolymer to reaction for chain extension by water and emulsification after or during neutralization of the urethane prepolymer with a tertiary amine, the urethane prepolymer consisting essentially of (i) an aliphatic and/or an alicyclic diisocyanate, (ii) a polyether diol and/or polyester diol both having a number-average molecular weight of about 500 to about 5000, (iii) a low-molecular weight polyhydroxyl compound and (iv) a dimethylolalkanoic acid in NCO/OH equivalent ratio of 1.1-1.9:1, the amount of the component (A) being about 1 to about 12% by weight and the amount of the component (B) being about 99 to about 88% by weight, based on the combined weight (calculated as solids) of the two components.

2. An aqueous coating composition as defined in claim 1 wherein the aqueous acrylic resin is an aqueous solution of acrylic resin.

3. An aqueous coating composition as defined in claim 1 which contains a metallic pigment and/or coloring pigment in addition to the component (A) and the component (B).

4. An aqueous coating composition as defined in claim 1 wherein the low-molecular weight polyhydroxyl compound as the component (iii) is less than about 500 in number-average molecular weight.

5. An aqueous coating composition as defined in claim 1 wherein the ratio of the component (A)/the component (B) is about 11/89 to about 5/95 based on the combined weight (calculated as solids) of the two components.

* * * * *